2,975,056

COFFEE FOAM REDUCTION

Eugene H. Lombardi, Port Chester, N.Y., assignor to General Foods Corporation, White Plains, N.Y., a corporation of Delaware No Drawing. Filed Nov. 20, 1958, Ser. No. 775,104

3 Claims. (Cl. 99—71)

This invention relates to a process for coffee foam reduction.

In the production of dried soluble coffee powders produced by spray drying, drum drying and like processes a problem exists in the form of so-called "gold specks" which appear in the finished dried product. These gold specks are undesirable since the consumer customarily associates dark soluble coffee powder with robustness and coffee strength. It would be desirable to eliminate the occurrence of gold specks in the soluble coffee product and thus provide a more uniform and dark colored product.

The foregoing problem appears to stem from foaming which develops in a holding tank after the coffee extract is recovered in a percolation operation. Customarily coffee extract of a concentration anywhere from 10–35% contains therein about 10% air in solution. When the extract is recovered from the plant percolation operation foaming occurs by reason of the reduction in pressure from that prevailing in the percolation cycle and this in turn releases the air from solution.

In present soluble coffee production the foam occurring in the collection or scale tank presents bothersome production difficulties and eventually must be separated from the liquor and washed away. To explain, in the scale tank the foam interferes with the ability to determine the level of solution in the tank and the determination of the density of the solution. In addition, by reason of the foam volume the size of the collecting or scale tank must be correspondingly increased which represents a more costly installation. Furthermore, such increase in the size of the collecting tank reduces the accuracy of determining the density of the solution by weight and as a consequence reduces the ability to accurately determine and control the density of dried extract. Of course, there are the additional foam-handling problems which introduce operating expense by reason of the steps required to eliminate the foam as well as the loss of product itself represented by the soluble solids contained in the foam, such solids not being recovered but simply lost as wastage in foam disposal.

It is an object of the present invention to provide means whereby dried soluble coffee extract can be produced which is relatively free of the aforesaid gold specks. A further object of the present invention is to provide a process whereby in reducing the population of gold specks in a soluble coffee powder product operating expense is substantially reduced by elimination of the costly and troublesome foaming problem arising in producing an extract.

In accordance with the present invention the aqueous extract of roasted and ground coffee having a soluble solids concentration ranging upwardly from 10% and ranging generally between 10–35% is subjected to sonic vibration. Preferably, such vibrations are directed to the surface interface between the foam prevailing at the top of a body of the extract and the extract itself although they can also be directed to the body of extract or to the foam. Sonic vibration is preferably practiced when the extract is in a cooled condition, say in the order of 40°–50° F. However, although the features of the present invention are more manifest in the case of sonic vibration applied to a relatively cold body of extract and foam thereabove, the invention may also be practiced to eliminate foam in the case of a relatively warm body of foam and extract, the problem of foam being less severe in the last case. In this connection, it is within the scope of the present invention that heat energy would be applied to the body of foam in order to reduce its viscosity and thereby improve the efficacy of sonic vibration in liberating the air entrapped in the foam phase; such means as an infra-red heat, hot air and the like may be employed.

The great advantage of the present invention is that it permits the defoaming of a body of extract which is necessarily cooled upon collection in order that it may be continuously fed to such drying means as a spray dryer, drum dryer and the like, soluble coffee plant design customarily employing a continuous method of drying and a batch method of extraction.

The term "sonic vibration" is intended to describe that acoustic energy which has a frequency of above 10,000 cycles per second. In this connection, the frequency may range anywhere from 10,000 cycles to many megacycles per second.

In practicing the present invention the sonic energy may be applied to the interface between the body of extract and the foam thereabove simply by locating a source of vibration in the vicinity of an open tank containing the extract and the foam. However, although an open tank may be employed, it is within the spirit of the present invention that a closed vessel containing the foam and the liquor may also be subjected to such high frequencies. In any event, sonic energy is preferably applied by any suitable means whereby air is caused to act upon the liquid extract and effectively eliminate the generation of foam through the liberation of air dissolved in the extract at the surface interface. Thus, a source of sonic vibration is preferably located at the point at which the cooled extract is collected in a collecting vessel and preferably such vibration is applied at a time prior to the evolution of foam. In accordance with the present invention, the sonic vibration may be employed to reduce foam which happens to be created in the course of any collection operation and so the invention will be understood to cover the practice of preventing as well as reducing foam at the surface of a body of extract.

Sonic vibration may be employed in a continuous as well as in a batch operation. Following present practices where a scale or collection tank is employed, a batch operation finds great use of this principle. But, it is also within the scope of the present invention that coffee extract issuing from the zone of percolation can be introduced to a flat surface or any other surface capable of increasing the surface area of the liquid whereby upon introduction of sonic vibration the dissolved air may be effectively "boiled" out of solution without collateral development of foam; in this connection the efficiency of any such continuous operation can be improved by employing a vacuum at the zone of "boiling." By virtue of the efficiency of such a continuous operation the procedure of cooling the extract prior to spray drying may be dispensed with since the sonic "boiling" would be carried out in a confined area in a short period of time such that a problem of bacteriological spoilage is minimized; as a consequence of this, heat may also be employed in the continuous sonic boiling of air from the extract and the effects of vacuum as well as heat may also be used in combination to further improve efficiency. Furthermore, as a means to introduce sonic vibration a "steam-whistle" may be employed, the whistle providing the sonic vibration and steam providing the heat to reduce extract viscosity and thereby reduce the tendency for foam to develop.

The invention will now be more fully described in the accompanying example describing the application of the present invention.

To remove 10% air entrainment in solution from 18 gallons of coffee extract per minute the following arrangement is applied. A stainless steel box shaped vessel with the dimensions of 50 inches long, 10 inches wide and 22 inches high is fitted with twenty acoustic generators. The vessel is introduced in the line prior to the cooling vessel or prior to the extract cooler. The generators are spaced five inches on centers at the top of the box. One end is inclined to allow the flow of 18 gallons per minute to attain a height of eight inches of extract. Passive or active agitators are installed within the box so as to be immersed in the solution at all times. Acoustic generators producing an acoustic energy of at least 120 decibels at the surface of the liquid at a frequency of 10,000 to 18,000 cycles are used, the upstream generator being the lowest frequency while the downstream generator the highest frequency in this instance. Suitable acoustic insulation is placed around the box for the comfort and safety of operating personnel who may be in or near the vicinity of the foam reducer.

Although this invention has been herein described in terms of a specific embodiment, it is to be understood that this example is for purposes of illustration only and that the invention is not limited thereto, reference being had to the appended claims for a definition of the scope of this invention.

What is claimed is:

1. A process for reducing foam from an aqueous coffee extract having a soluble solids concentration above 10% which comprises maintaining a body of said aqueous coffee extract, producing sonic vibrations in air above the surface of said body of extract, and directing said sonic vibrations toward the surface of said body of extract.

2. A process for reducing foam from an aqueous coffee extract having a soluble solids concentration above 10% which comprises maintaining a body of said aqueous coffee extract having foam at the surface-interface, producing sonic vibrations in air above said surface-interface of said body of extract, and directing said sonic vibrations to the surface-interface between the foam and the surface of said body of extract.

3. A process for reducing foam from an aqueous coffee extract having a soluble solids concentration above 10% which comprises maintaining a body of aqueous coffee extract having foam at the surface, producing sonic vibrations in air above the surface of said body of extract, and directing said sonic vibrations to the foam on top of said body of extract.

References Cited in the file of this patent

UNITED STATES PATENTS

| | | |
|---|---|---|
| 2,576,297 | Horsley et al. | Nov. 27, 1951 |
| 2,775,434 | Probst | Dec. 25, 1956 |